July 18, 1944.                M. J. JOHNSON                    2,353,670
                    ALTERNATING-CURRENT SYNCHRONOUS MOTOR
                         Filed Dec. 2, 1942            2 Sheets-Sheet 2
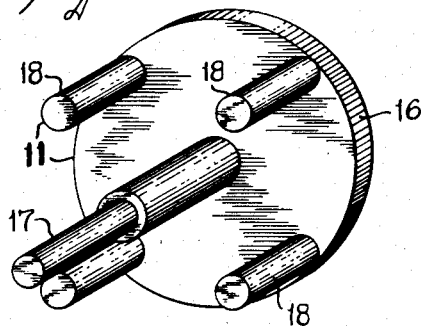
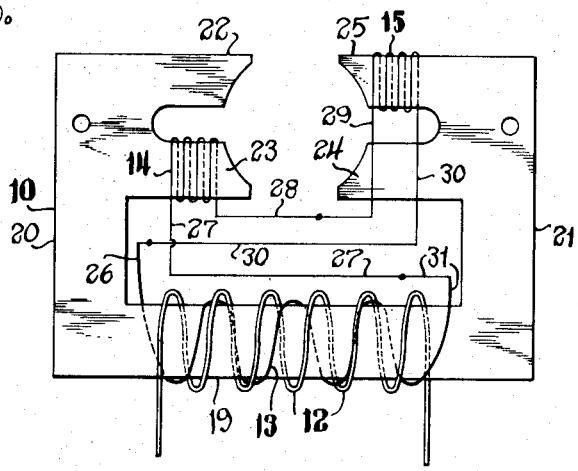
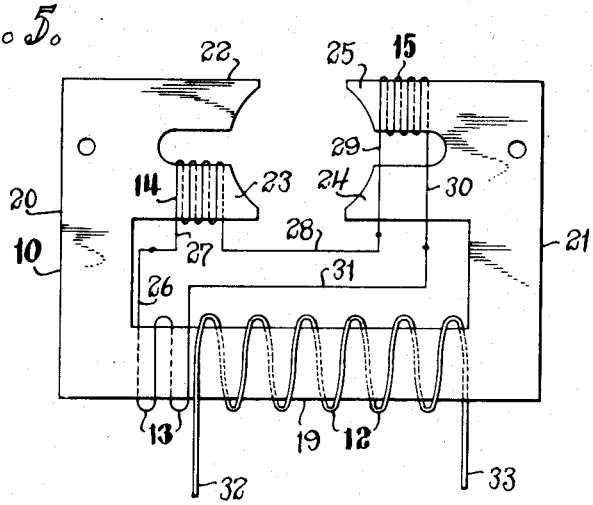
Inventor
By Manfred J. Johnson
Attorneys Patented July 18, 1944

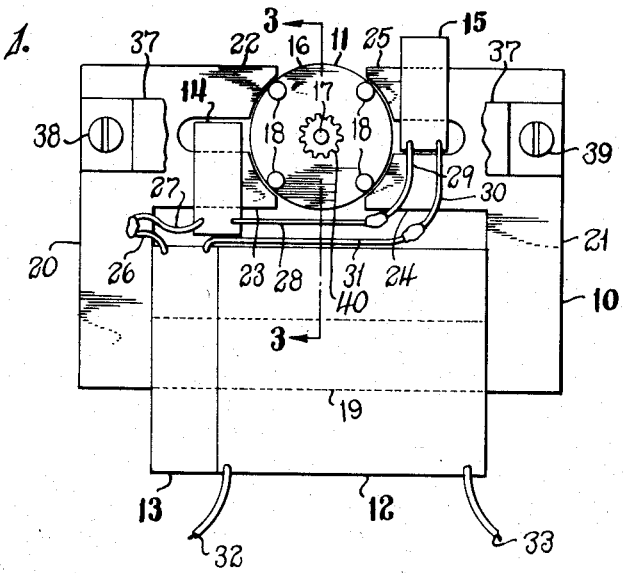
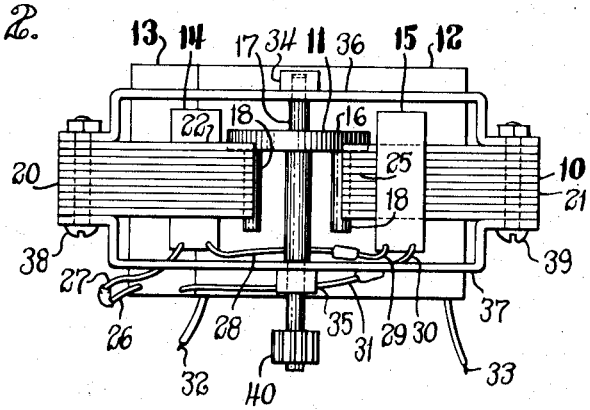
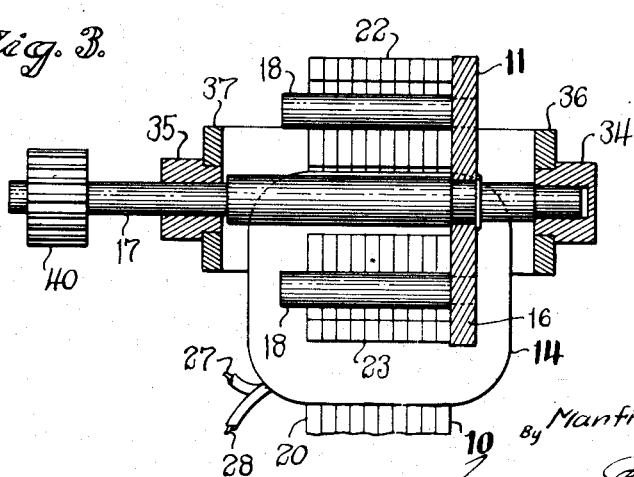

2,353,670

UNITED STATES PATENT OFFICE 2,353,670

ALTERNATING-CURRENT SYNCHRONOUS MOTOR

Manfred J. Johnson, New Haven, Conn., assignor to The United States Time Corporation, a corporation of Connecticut Application December 2, 1942, Serial No. 467,563

3 Claims. (Cl. 172—278)

The present invention relates to improvements in synchronous electric motors of the type suitable for use in driving clock-mechanisms and other mechanisms wherein it is desired to provide a definite rate of movement with reference to the pulsations of an alternating or other sinuous current-supply. More particularly, the present invention relates to motors of the type referred to wherein provision is made for producing both a synchronous-torque and a starting-torque. In accordance with the present invention, the starting-torque referred to may be sufficient to make the synchronous motor of the present invention self-starting, or such starting-torque may be only such as will give the motor a "bias," so to speak, favoring rotation in one direction when the motor is started manually or by other extraneous means.

One of the objects of the present invention is to provide a superior synchronous electric motor which will produce both synchronous-torque and starting-torque in a simple, reliable and effective structure.

Another object of the present invention is to provide a superior synchronous electric motor embodying both shaded and unshaded polesalients and wherein means is provided for causing the shaded salients of the stator-structure to produce a flux-density more nearly equal to the flux-density produced by the unshaded polesalients of the stator-structure than has been the case in single-phase alternating-current synchronous motors previously employed in clocks and the like.

A further object of the present invention is to provide a self-starting synchronous electric motor which will operate reliably at a predetermined synchronous speed despite changes in the voltage.

A still further object of the present invention is to provide a synchronous electric motor of the type operable from a single source of single-phase alternating-current, with superior means whereby such single-phase is split to provide a starting-torque in addition to a synchronous-torque.

Still another object of the present invention is to provide a synchronous electric motor-structure with superior means for providing a starting-torque sufficient to bring the motor from rest up to synchronous speed without, however, breaking through the lock-in effect at synchronous speed to thus cause a nonsynchronous overspeeding.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 1 is a face view of a self-starting synchronous electric motor embodying the present invention and showing a portion of one of the brackets broken away for clarity of illustration;

Fig. 2 is a top or plan view thereof;

Fig. 3 is a broken sectional view taken on the line 3—3 of Fig. 1;

Fig. 4 is a perspective view of the rotor, detached;

Fig. 5 is a face view of the stator-frame, detached, and schematically showing one arrangement of the main-magnetizing coil, the phase-shifting coil, and the two salient-magnetizing coils thereon; and Fig. 6 is a view similar to Fig. 5, but showing an alternative relative arrangement of the coils.

The particular synchronous electric motor herein chosen for purposes of illustrating one form of the present invention comprises, in the main, a stator-frame 10, an armature or rotor 11, a primary or main-magnetizing coil 12, a secondary or phase-shifting coil 13, and two pole salient magnetizing coils 14 and 15.

All of the parts above described with the exception of the rotor 11 may be said to constitute a field- or stator-structure which is constructed and arranged to exert both starting-torque and synchronous-torque upon the said rotor 11, in a manner as will more fully hereinafter appear.

The rotor 11 may be of any suitable type, but in the particular instance shown, the said rotor includes a disk 16 rigidly mounted concentrically upon a rotor-shaft 17 and having extending therefrom at four (more or less) equi-distant points adjacent its periphery, rotor-salients 18. Preferably the disk 16 is formed of soft iron or steel having relatively-low retentivity and the rotor-salients 18 referred to, are preferably in the form of pins or bars, as shown, which are staked at their respective ends into the disk 16. Preferably the said bar-like salients are formed of magnetic material of high retentivity such, for instance, as cobalt-bearing magnet steel.

The field- or stator-frame 10 before referred to is preferably formed of laminations of soft iron, silicon steel or other suitable magnetic material having low hysteresis characteristics. The said stator-frame is provided centrally with a core-portion 19 passing axially through both of the coils 12 and 13. At each of the respective opposite ends of its core-portion 19, the stator-frame has one of two complemental pole-arms 20 and 21 extending upwardly into proximity to the rotor 11.

The pole-arm 20 of the stator-frame 10 is provided at its upper end with an outer pole-salient 22 and an inner pole-salient 23 both extending tangentially inwardly toward the rotor 11. The pole-arm 21 like the pole-arm 20 is also provided at its upper end with an inner pole-salient 24 and an outer pole-salient 25 both projecting tangentially inwardly toward the rotor 11 and in opposition to the pole-salients 22 and 23 of the pole-arm 20. The respective inner faces of all of the pole-salients 22, 23, 24 and 25 are cylindrically contoured about an axis substantially corresponding to the axis of rotation of the rotor 11, as is clearly shown in Figs. 1, 5 and 6.

The pole salient magnetizing coil 14 before referred to encircles the inner pole-salient 23 of the pole-arm 20, while the pole salient magnetizing coil 15 encircles the outer pole-salient 25 of the complemental pole-arm 21, all for purposes as will more fully hereinafter appear.

In the structure of Figs. 1 to 5 inclusive, the left-hand terminal-lead 26 of the phase-shifting coil 13 is connected to the left-hand terminal-lead 27 of the salient-magnetizing coil 14. The right-hand terminal-lead 28 of the coil 14 just referred to is connected to the left-hand terminal-lead 29 of the salient-magnetizing coil 15. The right-hand terminal-lead 30 of the coil 15 is connected to the right-hand terminal-lead 31 of the phase-shifting coil 13. Under these conditions, all three of the coils 13, 14 and 15 are connected in series.

As before noted, the main-magnetizing coil 12 encircles a portion (the core-portion 19) of the stator-frame 10 so as to magnetize the said stator-frame when the respective terminal-leads 32 and 33 of the said coil, are connected to a source of alternating current such, for instance, as 60-cycle, 110-volt alternating current.

The rotor-shaft 17 before referred to is supported for rotation adjacent its respective opposite ends in bushings 34 and 35 respectively supported in bridging-bars 36 and 37 extending transversely on opposite sides of the stator-frame 10. The bridging-bars 36 and 37 just referred to, have their central portions outwardly offset and bolts 38 and 39 or their equivalent serve to clamp respectively the left ends of the said bridging-bars and the right ends of the said bridging-bars to each other and to the adjacent portions of the pole-arms 20 and 21. The said bridging-bars 36 and 37 are preferably formed of brass or other suitable nonmagnetic material and the bolts 38 and 39 serving to hold the said bridging-bars in place, also serve to clamp the laminations of the stator-frame 10 together. At its end adjacent the bushing 35 and bridging-bar 37, the rotor-shaft 17 projects completely through the said bushing 35 and beyond the outer end thereof where the said rotor-shaft is provided with a pinion 40. The said pinion 40 may have connected to it the time-train of a clock or other instrument which it is desired to drive at a definite time-rate.

When the main-magnetizing coil 12 is connected through the intermediary of its terminal-leads 32 and 33 to a suitable source of alternating-current supply, it will magnetize the stator-frame 10 so as to impart opposite instantaneous-polarities respectively to the pole-arms 20 and 21. Thus, at a given instant, the outer pole-salient 22 of the pole-arm 20 will have imparted to it a north polarity while at substantially the same instant the inner pole-salient 24 of the pole-arm 21 will have a south polarity imparted to it. Both of the pole-salients 22 and 24 will receive their respective north and south polarities at substantially the same instant as the corresponding polarities are imparted to their respective pole-arms 20 and 21. The pole-salients 23 and 25, however, will not instantaneously respond to the polarities applied to their respective pole-arms 20 and 21, owing to the presence around the said salients of the coils 14 and 15 respectively.

The energization of the main-magnetizing coil 12 as before described, will result in inducing a flow of current in the phase-shifting coil 13, which current will flow through both of the pole salient magnetizing coils 14 and 15. The current induced in the phase-shifting coil 13, however, will occur substantially ninety electrical degrees behind that flowing through the main-magnetizing coil 12.

By the flow of current above described to the pole salient magnetizing coils 14 and 15, the individual pole-salients 23 and 25 will be directly magnetized by the said coils which respectively encircle them. This magnetization, however, will lag substantially ninety electrical degrees behind the magnetization of the complemental pole-salients 22 and 24, which latter are magnetized by the main-magnetizing coil 12. The coils 14 and 15 are so related with respect to each other that the inner tips of the pole-salients 23 and 25 will have imparted to them opposite instantaneous-polarities respectively which lag, however, behind the instantaneous-polarities of the pole-salients 22 and 24 as before described.

By virtue of the lag of the peak-magnetism in the pole-salients 23 and 25 with respect to the peak-magnetism in the pole-salients 22 and 24, a shifting-field will be produced of a character sufficiently akin to a true rotating-field to exert upon the rotor both a starting-torque and a synchronous-torque. When sufficiently strongly energized, the pole salient magnetizing coils 14 and 15 will, in cooperation with the balance of the stator-structure, serve to start the rotor from rest and bring the same up to synchronous speed, which latter speed will, in the instance shown, be 1800 R. P. M. when the coil 12 is supplied with 60-cycle alternating current. If, on the other hand, it is desired merely to give the rotor a directional trend, the electrical energy applied to the coils 14 and 15, or their equivalent, may be limited in such manner that while starting-torque is applied to the rotor, such starting-torque will not be sufficient to start the rotor from rest. Under these conditions, the rotor 11, or any suitable substitute therefor, may be started manually or by means of any suitable extraneous device.

When the pole salient magnetizing coils 14 and 15 are so connected as to cause the magnetism in the inner tips of the pole-salients 23 and 25 to correspond in polarity at a given instant to the polarities preceding them by substantially 90° in the pole-salients 22 and 24 respectively, the starting-torque will be exerted in one direction. If, on the other hand, the coils 14 and 15 are so connected that the polarities which they respectively produce in the inner tips of the pole-salients 23 and 25 are of opposite polarity to that produced in the pole-salients 22 and 24 respectively ninety electrical degrees previously, then the starting-torque will be exerted in a direction opposite to that first referred to, all as will be fully apparent to those skilled in the art. In Fig. 5 is schematically shown a relationship of windings which will produce (in addition to synchronous-torque) a starting-torque in one direction, whereas in Fig. 6 is schematically shown an arrangement wherein the starting-torque will be effective in a reverse direction from that of the structure of Fig. 5.

In Fig. 5, as well as in Figs. 1 and 2, the phase-shifting coil is shown as located at one end of the main magnetizing-coil, whereas in Fig. 6 the phase-shifting coil is shown as being enclosed within the main magnetizing-coil. In both instances, however, the phase-shifting coils are inductively related to their respective main magnetizing-coils.

As will be apparent to those skilled in the art, but one pole-salient magnetizing coil may be employed in instances where desirable, though it is preferred for general use that there be at least two complemental pole salient magnetizing coils.

By mounting a pole salient energizing coil directly on one of a pair of pole-salients and indirectly energizing such a coil by means of a phase-shifting coil inductively coupled to a main magnetizing-coil, not only is a very marked phase displacement produced from a single source of single-phase alternating current, but the magnetic strength of the pole-salients encircled by a pole salient magnetizing coil may be made of such magnitude as to substantially correspond to the density of magnetism produced by the companion and unwound salient. In this manner, the wound pole-salients may be utilized not only to impart starting-torque to the rotor but to add to the full-speed torque when the rotor reaches synchronous speed.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An alternating-current electric motor of the type producing both synchronous-torque and starting-torque from a single source of single-phase alternating current, including in combination: a rotor formed of magnetic material; a stator-frame formed of magnetic material and having two pole-portions respectively of opposite instantaneous-polarity and both extending adjacent the path of rotation of the said rotor, each of the two said pole-portions being divided adjacent the said rotor into two pole-salients both magnetically acting on the said rotor to effect the rotation thereof; a main-magnetizing coil encircling a portion of the said stator-frame in position to impart opposite instantaneous-polarities to the respective pole-portions of the said stator-frame in response to alternating current supplied to the said main-magnetizing coil; a phase-shifting coil also encircling a portion of the said stator-frame in position to be inductively energized by energy supplied by the said main-magnetizing coil; two salient-magnetizing coils respectively encircling one of the two pole-salients of the two pole-portions of the said stator-frame; and connecting-means electrically connecting the said phase-shifting coil to both of the two said salient-magnetizing coils in such manner that the latter coils impart peak-magnetism substantially simultaneously to both of the pole-salients which they respectively encircle at a later instant than the said main-magnetizing coil imparts peak-magnetism to the respective other pole-salient of each of the pole-portions of the stator-frame, to thereby apply a starting-torque to the said rotor; each of the said pole-salient magnetizing coils being constructed and arranged to encircle only one of the aforesaid pole-salients to thereby avoid having the said main-magnetizing coil supply magnetism of two polarities to the portion of the stator-frame encircled by a given one of the said pole-salient magnetizing coils.

2. An alternating-current electric motor of the type producing both synchronous-torque and starting-torque from a single source of single-phase alternating current, including in combination: a rotor formed of magnetic material; a stator-frame formed of magnetic material and having a first pole-portion and a second pole-portion respectively of opposite instantaneous-polarity and both extending adjacent the path of rotation of the said rotor, each of the two said pole-portions being divided adjacent the said rotor into two pole-salients both magnetically acting on the said rotor to effect the rotation thereof; a main-magnetizing coil encircling a portion of the said stator-frame in position to impart opposite instantaneous-polarities to the respective pole-portions of the said stator-frame in response to alternating-current supplied to the said main-magnetizing coil; a phase-shifting coil also encircling a portion of the said stator-frame in concentric relationship with respect to the said main-energizing coil and in position to be inductively energized thereby; two salient-magnetizing coils respectively encircling one of the pole-salients of each of the two pole-portions of the said stator-frame; and connecting-means electrically-connecting the said phase-shifting coil to both of the two said salient-magnetizing coils in such manner that the latter coils impart peak-magnetism substantially simultaneously to both of the pole-salients which they respectively encircle at a later instant than the said main-magnetizing coil imparts peak-magnetism to the respective other pole-salient of each of the pole-portions of the stator-frame, to thereby apply a starting-torque to the said rotor; each of the said pole-salient magnetizing coils being constructed and arranged to encircle only one of the aforesaid pole-salients to thereby avoid having the said main-magnetizing coil supply magnetism of two polarities to the portion of the stator-frame encircled by a given one of the said pole-salient magnetizing coils.

3. An alternating-current electric motor of the type producing both synchronous-torque and starting-torque from a single source of single-phase alternating current, including in combination: a rotor formed of magnetic material; a stator-frame of substantially C-shape and formed of magnetic material and comprising a core-portion and two pole-arms respectively projecting from opposite ends of the said core-portion into position adjacent the said rotor, each of the said pole-arms being divided adjacent the said rotor into two pole-salients both magnetically acting on the said rotor to effect the rotation thereof; a main-magnetizing coil encircling the core-portion of the said stator-frame in position to impart opposite instantaneous-polarities to the respective pole-arms of the stator-frame in response to alternating current supplied to the said main-magnetizing coil; a phase-shifting coil also encircling the core-portion of the said stator-frame intermediate the two pole-arms thereof and in concentric relationship with respect to the said main-magnetizing coil so as to be energized thereby; two salient-magnetizing coils respectively encircling one of the two pole-salients of the two pole-arms of the said stator-frame; and connecting-means electrically connecting the said phase-shifting coil to both of the two said salient-magnetizing coils in such manner that the latter coils impart peak-magnetism substantially simultaneously to both of the pole-salients which they respectively encircle at a later instant than the said main-magnetizing coil imparts peak-magnetism to the respective other pole-salients of each of the said pole-arms of the stator-frame, to thereby apply a starting-torque to the said rotor; each of the said pole-salient magnetizing coils being constructed and arranged to encircle only one of the aforesaid pole-salients to thereby avoid having the said main-magnetizing coil supply magnetism of two polarities to the portion of the stator-frame encircled by a given one of the said pole-salient magnetizing coils.

MANFRED J. JOHNSON.